(12) United States Patent
Uchino et al.

(10) Patent No.: US 6,503,301 B2
(45) Date of Patent: Jan. 7, 2003

(54) FUEL VAPOR TREATMENT CANISTER

(75) Inventors: Masashi Uchino, Saitama (JP); Masaru Nakano, Saitama (JP)

(73) Assignee: Tennex Corporation, Tokyo (JP)

( * ) Notice: Subject to any disclaimer, the term of this patent is extended or adjusted under 35 U.S.C. 154(b) by 12 days.

(21) Appl. No.: 09/746,812

(22) Filed: Dec. 26, 2000

(65) Prior Publication Data

US 2001/0015134 A1 Aug. 23, 2001

(30) Foreign Application Priority Data

Dec. 28, 1999 (JP) ............................. 11-375151
Dec. 19, 2000 (JP) ........................ 2000-386086

(51) Int. Cl.[7] ............................................. B01D 53/02
(52) U.S. Cl. ............................. 96/132; 96/135; 96/144; 123/519
(58) Field of Search .......................... 123/519; 95/146; 55/385.3; 96/121, 130, 131, 132, 134, 135, 143, 144, 142, 147

(56) References Cited

U.S. PATENT DOCUMENTS

| | | | |
|---|---|---|---|
| 3,730,158 A | * | 5/1973 | St. Amand |
| 3,844,739 A | * | 10/1974 | Alfrey, Jr. |
| 4,306,894 A | * | 12/1981 | Fukami et al. |
| 4,381,929 A | * | 5/1983 | Mizuno et al. |
| 4,386,947 A | * | 6/1983 | Mizuno et al. |
| 4,496,379 A | * | 1/1985 | Kozawa |
| 5,173,095 A | * | 12/1992 | Yasukawa et al. |
| 5,207,808 A | * | 5/1993 | Haruta et al. |
| 5,304,235 A | * | 4/1994 | Watanabe et al. |
| 5,393,329 A | * | 2/1995 | Inagaki et al. |
| 5,408,976 A | * | 4/1995 | Reddy |
| 5,538,542 A | * | 7/1996 | Watanabe et al. |
| 5,538,543 A | * | 7/1996 | Watanabe et al. |
| 5,564,398 A | * | 10/1996 | Maeda et al. |
| 5,645,036 A | * | 7/1997 | Matsumoto et al. |
| 5,851,268 A | * | 12/1998 | Hyodo et al. |
| 5,914,457 A | * | 6/1999 | Itakura et al. |
| 5,992,397 A | | 11/1999 | Hideaki et al. ............ 123/538 |
| 2001/0015134 A1 | * | 8/2001 | Uchino et al. |
| 2001/0020418 A1 | * | 9/2001 | Yamafuji et al. |
| 2002/0020398 A1 | * | 2/2002 | Kimoto et al. |

FOREIGN PATENT DOCUMENTS

| | | | |
|---|---|---|---|
| JP | 57-176351 | * | 10/1982 |
| JP | 63-117155 | * | 5/1988 |
| JP | 64-176650 | * | 7/1988 |
| JP | 64-67222 | * | 3/1989 |
| JP | 5-231249 | * | 9/1993 |
| JP | 112356 | | 4/1997 |
| JP | 2001-182631 | * | 7/2001 |
| JP | 2001-248504 | * | 9/2001 |

OTHER PUBLICATIONS

Patent Abstracts of Japan 13 (223) M829, May 24, 1989 & JP 01 036961 A (Toyota Motor Corp. & Dev. Lab. Inc.) Feb. 7, 1989 (Abstract).
Patent Abstracts of Japan 1996 (3), Mar 29, 1996 & JP 07 293365 A (Honda Motor Co. Ltd.) Nov. 7, 1995 (Abstract).
Patent Abstracts of Japan 1997 (8), Aug. 29, 1997 & JP 09 112356 A (Honda Motor Co. Ltd.) Apr. 28, 1997 (Abstract).
Patent Abstracts of Japan 1999 (3), Mar. 31, 1999 & JP 10 339218 A (Honda Motor Co. Ltd.) Dec. 22, 1998 (Abstract).

* cited by examiner

Primary Examiner—Duane S. Smith
(74) Attorney, Agent, or Firm—Foley & Lardner

(57) ABSTRACT

A fuel vapor treatment canister is described. The canister includes a casing having first and second end walls between which an inside space is formed. The first end wall has a first opening in communication with a fuel tank, and a second opening in communication with an air intake passage of an engine. The second end wall has a third opening in communication with the atmosphere. The inside space includes first and second chambers. The first chamber is located closer to the first end wall than the second chamber. A first fuel vapor adsorbing material is disposed in the first chamber. A second fuel vapor adsorbing material and a heat-accumulative material are disposed in the second chamber. The heat-accumulative material is larger in specific heat than the second fuel vapor adsorbing material.

11 Claims, 12 Drawing Sheets

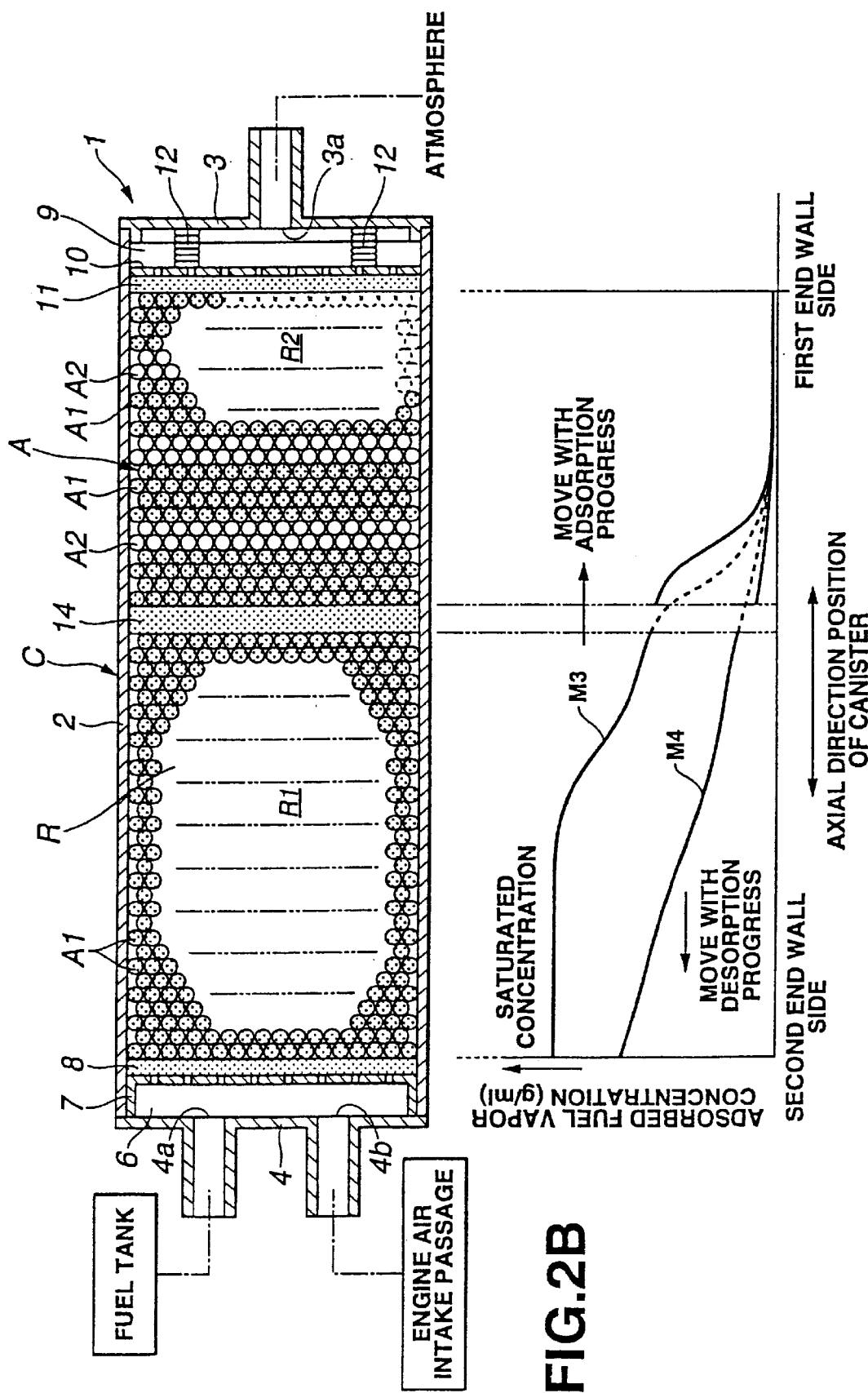

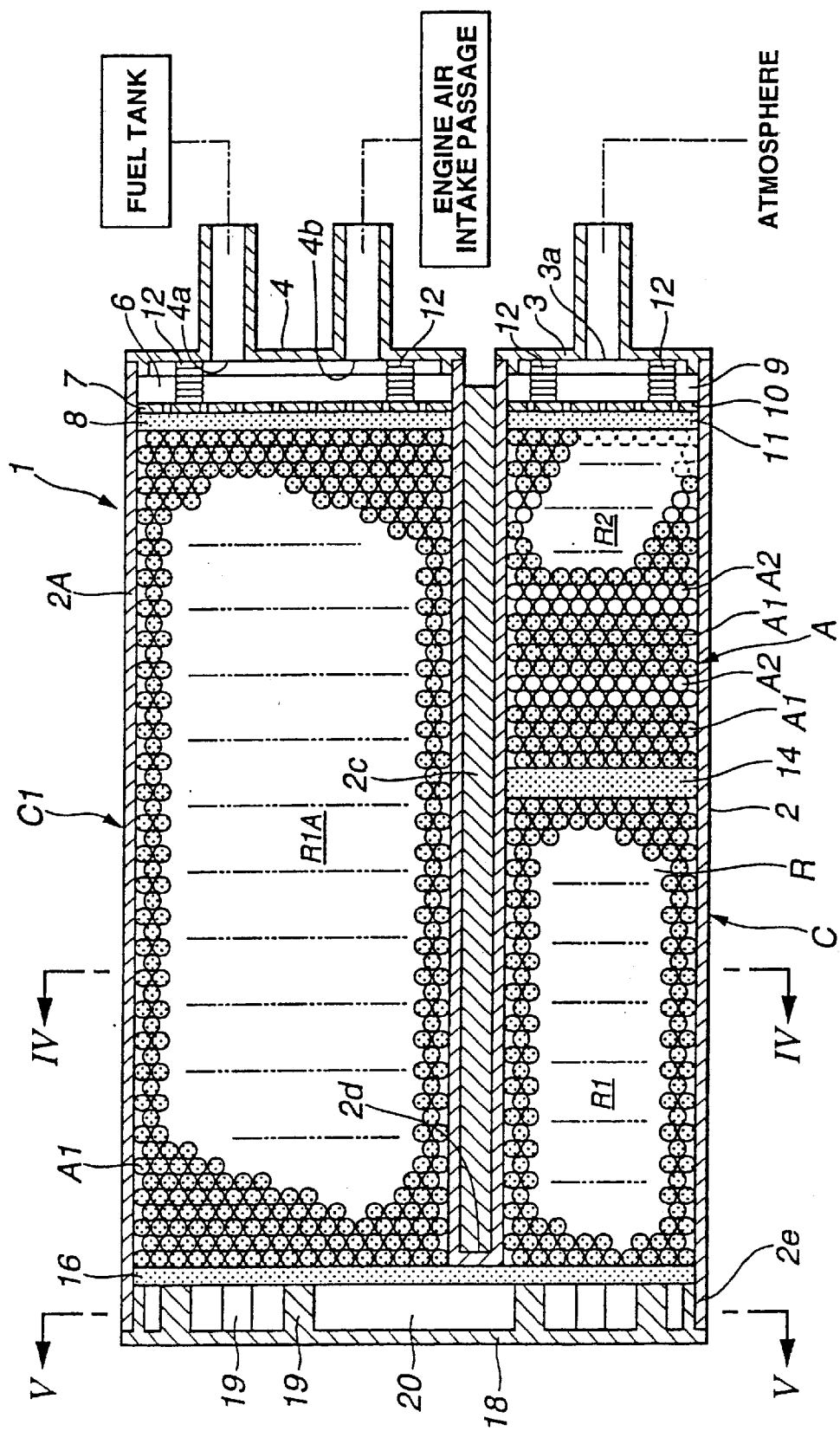

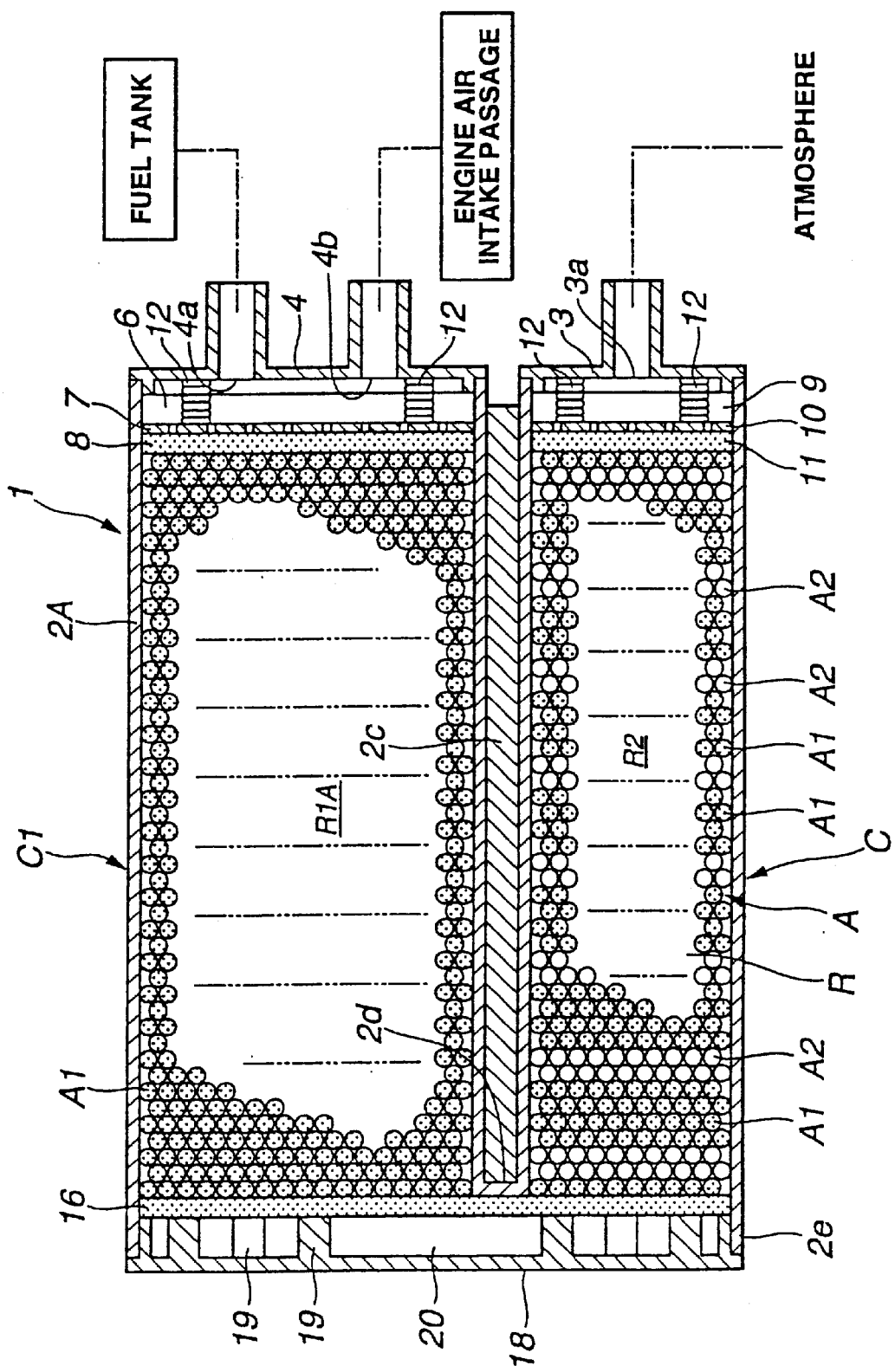

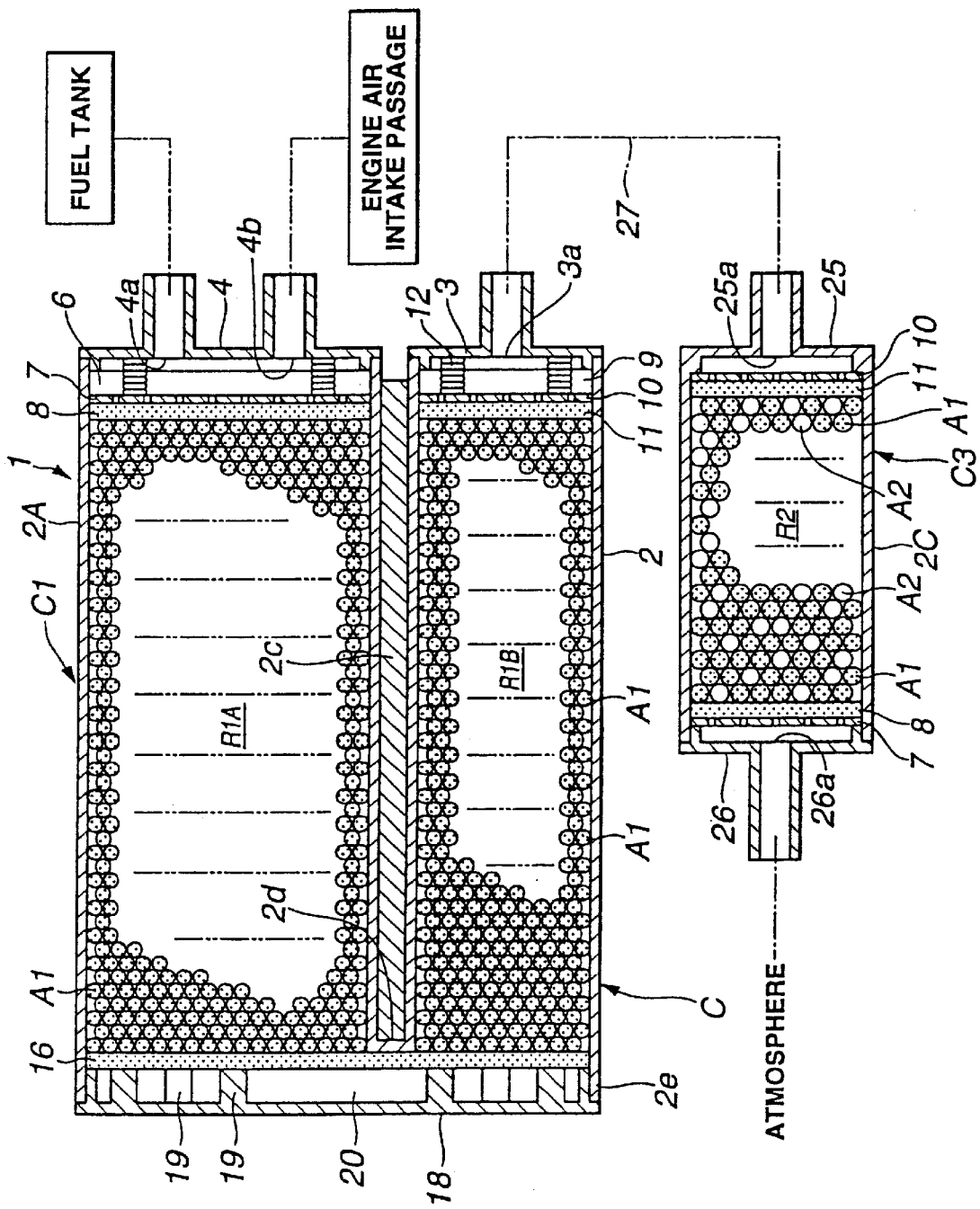

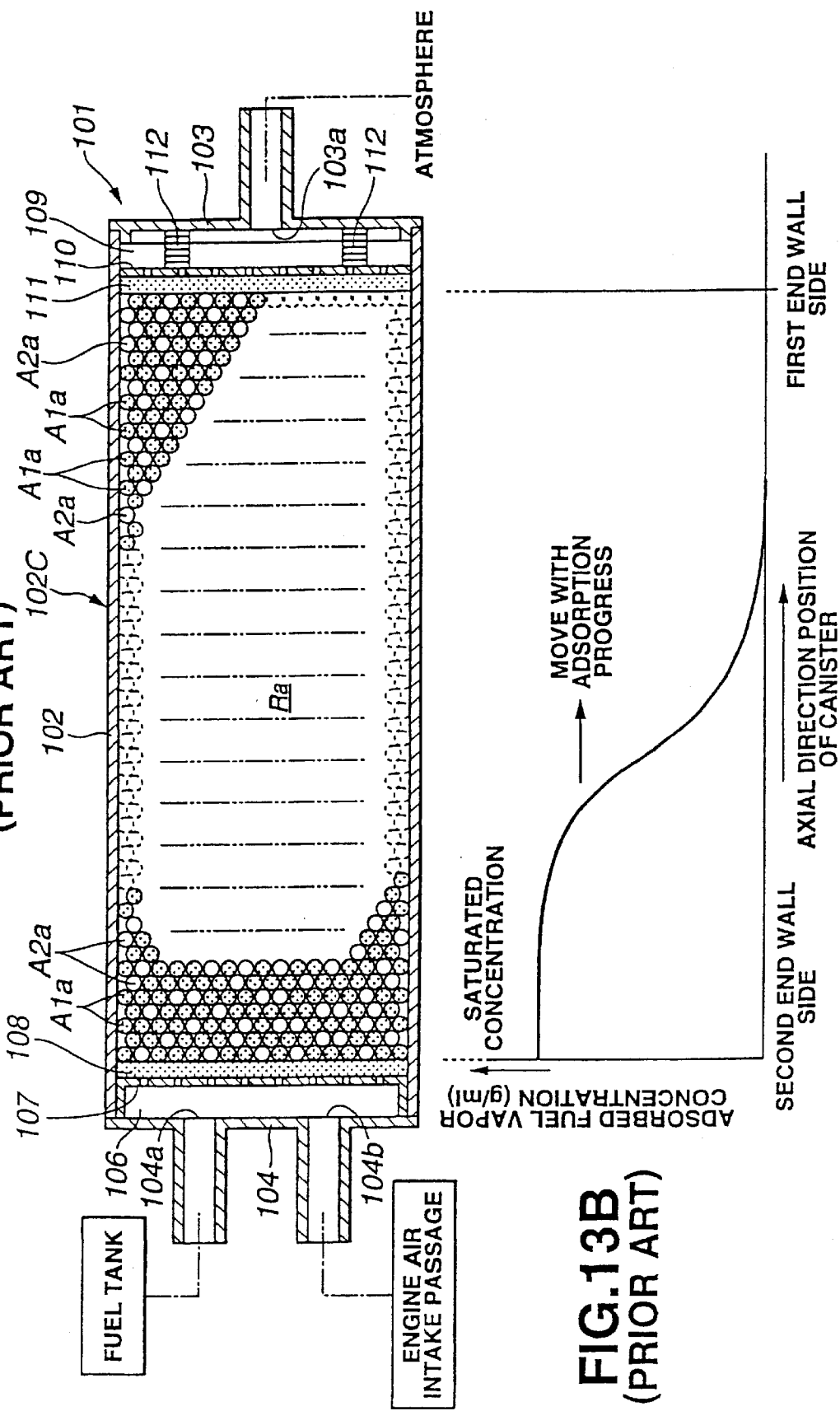

FUEL VAPOR TREATMENT CANISTER

BACKGROUND OF THE INVENTION

1. Field of the Invention

This invention relates to improvements in a fuel vapor treatment canister which is adapted to temporarily store therein fuel vapor generated in a fuel tank and the like and to release the stored fuel vapor at certain timings to be burnt in an engine in order to reduce the amount of fuel vapor emitted from the fuel tank and the like of a vehicle provided with the engine.

2. Description of the Prior Art

Hitherto most automotive vehicles are equipped with a fuel vapor treatment canister including fuel vapor adsorbing material (for example, crushed or granulated activated carbon) stored in a casing. Fuel vapor generated from a fuel tank is adsorbed by the fuel vapor adsorbing material, and then the adsorbed fuel vapor is desorbed from the fuel vapor adsorbing material at certain timings and carried to a combustion device (for example, combustion chambers of an engine, or a combustibles burning device of a vehicle equipped with a fuel cell) under the action of air flowing through the fuel vapor adsorbing material. This prevents fuel vapor from being released into the atmosphere. It will be understood that fuel vapor is generated in the fuel tank, for example, in the following cases:

(a) When an automotive vehicle is allowed to stand, fuel vapor is generated at a high temperature in the daytime under a temperature change between day and night.

(b) When the vehicle is stopped after its cruising (particularly after its high speed cruising), heat of an engine at a high temperature is transmitted to the fuel tank or the like. At this time, the temperature of the fuel tank or the like abruptly rises so that fuel vapor is generated in the fuel tank or the like.

(c) When fuel is supplied into the fuel tank, fuel vapor is generated in the fuel tank.

A typical example of such a conventional fuel vapor treatment canister is disclosed in Japanese Patent Provisional Publication No. 9-112356 and will be discussed with reference to FIG. 13A.

The fuel vapor treatment canister 101 includes a casing 102C. The casing 102C includes a cylindrical casing body 102 which is provided at its one end with a first end wall 103, and at the other end with a second end wall 104. The first end wall 103 has a pipe defining therein a communication opening 103a which is in communication with the atmospheric. The second end wall 104 has an upper pipe defining therein a fuel vapor inlet opening 104a which is in communication with a fuel tank so that fuel vapor is flown in through the opening 104a. The second end wall 104 further has a lower pipe defining therein a fuel vapor outlet opening 104b which is in communication with an air intake passage of an intake system of an internal combustion engine (not shown) so that fuel vapor is flown out through the opening 104b. A perforated dish-like plate 107 is disposed inside the casing body 102 and located adjacent the second end wall 104. The disk-like plate 107 is formed with a plurality of through-holes (not identified) and has a cylindrical flange section (not identified) which is fitted to the inner surface of the casing body 102 and in contact with the second end wall 104 so that a space 106 is defined between the dish-like plate 107 and the second end wall 104. A sheet-like filter 108 formed of a non-woven fabric of polyester or a sheet of polyurethane foam is disposed inside the dish-like plate 107 so as to be in contact with the dish-like plate 107.

A perforated plate 110 is disposed inside the casing body 102 and located adjacent the first end wall 103. Two compression springs 112, 112 are disposed between the perforated plate 110 and the first end wall 103 so as to define a space 109 inside the casing body 102. A filter 111 similar to the filter 108 is disposed inside and in contact with the perforated plate 110. A chamber or inside space Ra between the filter 108 and the filter 111. The chamber Ra is filled with a fuel vapor adsorbing material A1a and a heat-accumulative material A2a which is higher in heat conductivity and specific heat than the fuel vapor-adsorbing material A1a which are in a uniformly mixed state.

In operation, fuel vapor flowing in the canister 101 through the opening 104a is adsorbed by the fuel vapor adsorbing material A1a. At this time, the distribution of concentration of the adsorbed fuel is as shown in FIG. 13B in which the concentration of the fuel vapor is gradually saturated from a side near the second end wall 104 to a side near the first end wall 103. When the adsorption state has reaches a level at which fuel vapor is adsorbed by a portion of the fuel vapor adsorbing material A1a located near the first end wall 103, fuel vapor is released in an amount according to the concentration of the adsorbed fuel vapor at the portion through the opening 103a. It is to be noted that heat is generated so as to raise the temperature of the fuel vapor adsorbing material A1a when fuel vapor is adsorbed by the fuel vapor adsorbing material A1a. A fuel vapor amount corresponding to fuel vapor adsorbing ability of the fuel vapor adsorbing material A1a increases as the temperature rises. However, the heat generated by the fuel vapor adsorbing material A1a is adsorbed by the heat-accumulative material A2a thereby preventing the temperature of the fuel vapor adsorbing material A1a from rising. This prevents the fuel vapor amount corresponding to the fuel vapor adsorbing ability from being lowered.

In the intake stroke of an operational cycle of the engine, vacuum is generated in the air intake passage of the engine and transmitted through the opening 104b into the casing 102C. Accordingly, atmospheric air is introduced through the opening 103a into the casing 102C so as to develop air stream toward the opening 104b. Under the action of this air stream, fuel vapor (hydrocarbons) adsorbed by the fuel vapor adsorbing material A1a is desorbed and sucked through the opening 104b and the air intake passage into the engine to be combusted in the engine.

As shown in FIG. 14A, during desorption of the fuel vapor adsorbed by the fuel vapor adsorbing material A1a after fuel vapor adsorption indicated in FIG. 13B, the concentration of the adsorbed fuel vapor (or a fuel vapor residual level) takes a mode indicated by curves V1 which indicates the case where the fuel vapor adsorbing material A1a and the heat-accumulative material A2a are disposed in the chamber Ra. For reference, a curve V2 indicates a case where only the fuel vapor adsorbing material A1a such as activated carbon is disposed in the chamber Ra.

Additionally, as shown in FIG. 14B, during adsorption of fuel vapor by the fuel vapor adsorbing material A1a after fuel vapor desorption of FIG. 14A, the concentration of the adsorbed fuel vapor takes a mode indicated by a curve V3 which indicates the case where the fuel vapor adsorbing material A1a and the heat-accumulative material A2a are disposed in the chamber Ra. For reference, a curve V4 indicates a case where only the fuel vapor adsorbing material A1a such as activated carbon is disposed in the chamber Ra. FIG. 14B reveals that the fuel vapor residual level (the concentration of the adsorbed fuel vapor) at the respective positions in an axial direction of the canister is low in the case where the fuel vapor adsorbing material A1a and the heat-accumulative material A2a are disposed in the chamber Ra as compared with that in the case where only the fuel vapor adsorbing material A1a is disposed in the chamber Ra. This is because, in case that the fuel vapor adsorbing material A1a and the heat-accumulative material A2a are disposed in the chamber Ra, heat accumulated in the heat-accumulative material A2a is transmitted to the fuel vapor adsorbing material A1a during desorption of fuel vapor from the fuel vapor adsorbing material A1a, so that the temperature of the fuel vapor adsorbing material A1a is prevented from lowering thereby increasing the amount of fuel vapor desorbed from the fuel vapor adsorbing material A1a.

It will be understood that, in FIG. 14B, the difference between the concentration of adsorbed fuel vapor and the fuel vapor residual level at the side of the first end wall corresponds to the amount of fuel vapor desorbed from the fuel vapor adsorbing material A1a. FIG. 14B also reveals that the amount of fuel vapor adsorbed by the fuel vapor adsorbing material A1a at the respective positions in the flow direction of air and fuel vapor in the chamber R1a is large in the case where the fuel vapor adsorbing material A1a and the heat-accumulative material A2a are disposed in the chamber R as compared with that in the case where only the fuel vapor adsorbing material A1a is disposed in the chamber Ra. As a result, the amount of fuel vapor released from the canister to the atmosphere increases at a time when the amount of fuel vapor adsorbed by the fuel vapor adsorbing material A1a is not so large, in the case where only the fuel vapor adsorbing material A1a is disposed in the chamber Ra as compared with that in case where the fuel vapor adsorbing material A1a and the heat-accumulative material A2a are disposed in the chamber Ra. This is because, in case where only the fuel vapor adsorbing material A1a is disposed in the chamber Ra, the temperature of the fuel vapor adsorbing material A1a increases owing to heat generation at adsorption of fuel vapor to the fuel vapor adsorbing material A1a thereby decreasing the fuel vapor amount corresponding to the fuel vapor adsorbing ability.

As appreciated from the above, it may be advantageous to use the fuel vapor adsorbing material A1a and the heat-accumulative material A2a in the chamber Ra in order that adsorption and desorption of fuel vapor in the canister is required to be quickly accomplished.

SUMMARY OF THE INVENTION

However, drawbacks have been encountered in the above conventional fuel vapor treatment canister, as discussed below. For example, when the engine is started and is operated at high speeds upon depression of an accelerator pedal under a condition in which a large amount of fuel vapor has been adsorbed in the fuel vapor adsorbing material in the canister provided with the fuel vapor adsorbing material and the heat-accumulative material in the whole inside space or chamber (Ra) thereof, fuel vapor adsorbed in the fuel vapor adsorbing material is abruptly desorbed from the fuel vapor adsorbing material. At this time, the fuel vapor adsorbing material makes it temperature lowering owing to rapid desorption of fuel vapor from the fuel vapor adsorbing material; however, the temperature lowering can be suppressed upon receiving heat released from the heat-accumulative material. Accordingly, in case that the heat-accumulative material is used mixed with the fuel vapor adsorbing material, the temperature of the fuel vapor adsorbing material can be kept high as compared with a case in which the heat-accumulative material does not exist. As a result, a large amount of fuel vapor is abruptly desorbed so as to increase the fuel vapor construction of intake air to be sucked into the combustion cambers of the engine. This invites disorder of the engine or ineffective combustion within the combustion chambers due to suction of excessive fuel (hydrocarbons) thereby releasing unburned combustion gas (hydrocarbons) into the atmosphere. Japanese Patent Provisional Publication No. 9-112356 discloses also a fuel vapor treatment canister which contains the fuel vapor adsorbing material in the form of a layer and the heat-accumulative material in the form of a layer, in which the two layers are disposed alternate to each other. Such a conventional fuel vapor treatment canister also provides the same disadvantages as those in the above-discussed fuel vapor treatment canister shown in FIG. 13A.

In view of the above, it is an object of the present invention to provide an improved fuel vapor treatment canister which can overcome drawbacks encountered in conventional fuel vapor treatment canisters including ones disclosed in Japanese Patent Provisional Publication No. 9-112356.

Another object of the present invention is to provide an improved fuel vapor treatment canister which can effectively prevent an engine from becoming disordered and unburned hydrocarbons from being emitted to the atmosphere while increasing its fuel vapor adsorbing ability, thereby totally reducing emission of hydrocarbons to the atmosphere.

A further object of the present invention is to provide an improved fuel vapor treatment canister which can effectively prevent a large amount of fuel vapor from being abruptly sucked into an engine while increasing the amount of a fuel vapor adsorbing material disposed in the canister without enlarging the size of the canister.

A still further object of the present invention is to provide an improved fuel vapor treatment canister having a fuel vapor adsorption chamber and a heat accumulation and fuel vapor adsorption chamber, which is adapted to prevent heat generated in the fuel vapor adsorption chamber from being transmitted to the heat accumulation and fuel vapor adsorption chamber thereby preventing lowering in fuel vapor retaining ability of the fuel vapor adsorbing material in the heat accumulation and fuel vapor adsorption chamber which lowering it owing to temperature rise of the fuel vapor adsorbing material in the heat accumulation and fuel vapor adsorption chamber.

An aspect of the present invention resides in a fuel vapor treatment canister comprising a casing arrangement having first and second end walls between which first and second chambers are formed. The first end wall has a portion defining a first opening in communication with a fuel tank, and a portion defining a second opening in communication with an air intake passage of an engine. The second end wall has a portion defining a third opening in communication with atmosphere. The first chamber is located closer to the first end wall than the second chamber. A first fuel vapor adsorbing material is disposed in the first chamber, while a second fuel vapor adsorbing material and a heat-accumulative material are disposed in the second chamber. The heat-accumulative material is larger in specific heat than the second fuel vapor adsorbing material.

A second aspect of the present invention resides in a fuel vapor treatment canister comprising a casing having first and second end walls between which an inside space is formed.

The first end wall has a portion defining a first opening in communication with a fuel tank, and a portion defining a second opening in communication with an air intake passage of an engine. The second end wall has a portion defining a third opening in communication with atmosphere. The inside space includes first and second chambers. The first chamber is located closer to the first end wall than the second chamber. A first fuel vapor adsorbing material is disposed in the first chamber, while a second fuel vapor adsorbing material and a heat-accumulative material are disposed in the second chamber. The heat-accumulative material is larger in specific heat than the second fuel vapor adsorbing material.

A third aspect of the present invention resides in a fuel vapor treatment canister comprising a casing having first and second end walls between which an inside space is formed. The first end wall has a portion defining a first opening in communication with a fuel tank, and a portion defining a second opening in communication with an air intake passage of an engine. The second end wall has a portion defining a third opening in communication with atmosphere. The inside space includes first and second chambers. The first chamber is located closer to the first end wall than the second chamber. A partition wall structure is disposed to divide the inside space into the first and second chambers. The partition wall structure has an air permeability and a heat insulating ability higher than that of metal. A first fuel vapor adsorbing material is disposed in the first chamber. A second fuel vapor adsorbing material and a heat-accumulative material are disposed in the second chamber. The heat-conductive material is larger in specific heat than the second fuel vapor adsorbing material.

A fourth aspect of the present invention resides in a fuel vapor treatment canister comprising a first casing having first and second end walls between which a first chamber is formed. The first end wall has a portion defining a first opening in communication with a fuel tank, and a portion defining a second opening. Additionally, a second casing is provided having third and fourth end walls between which a second chamber is formed. The third end wall has a portion defining a third opening in communication with the second opening of the first casing. The fourth end wall has a portion defining a fourth opening in communication with atmosphere. A first fuel vapor adsorbing material is disposed in the first chamber, while a second fuel vapor adsorbing material and a heat-accumulative material are disposed in the second chamber. The heat-accumulative material is larger in specific heat than the second fuel vapor adsorbing material.

BRIEF DESCRIPTION OF THE DRAWINGS

In the drawings, like reference numerals designate like parts and elements throughout all figures, in which:

FIG. 2A is a longitudinal cross-sectional view of a second embodiment of the fuel vapor treatment canister according to the present invention;

FIG. 2B is graph showing the concentration of fuel vapor adsorbed in the canister of FIG. 2A in terms of the axial direction positions of the canister;

FIG. 3 is a longitudinal cross-sectional view of a third embodiment of the fuel vapor treatment canister according to the present invention;

FIG. 11 is a longitudinal cross-sectional view of an eighth embodiment of the fuel vapor treatment canister according to the present invention;

FIG. 12 is a longitudinal cross-sectional view of a ninth embodiment of the fuel vapor treatment canister according to the present invention;

FIG. 13A is a longitudinal cross-sectional view of a conventional fuel vapor treatment canister;

FIG. 13B is a graph showing the concentration of fuel vapor adsorbed in the canister in terms of the axial direction positions of the canister of FIG. 13A;

DETAILED DESCRIPTION OF THE INVENTION

Figure 1A:
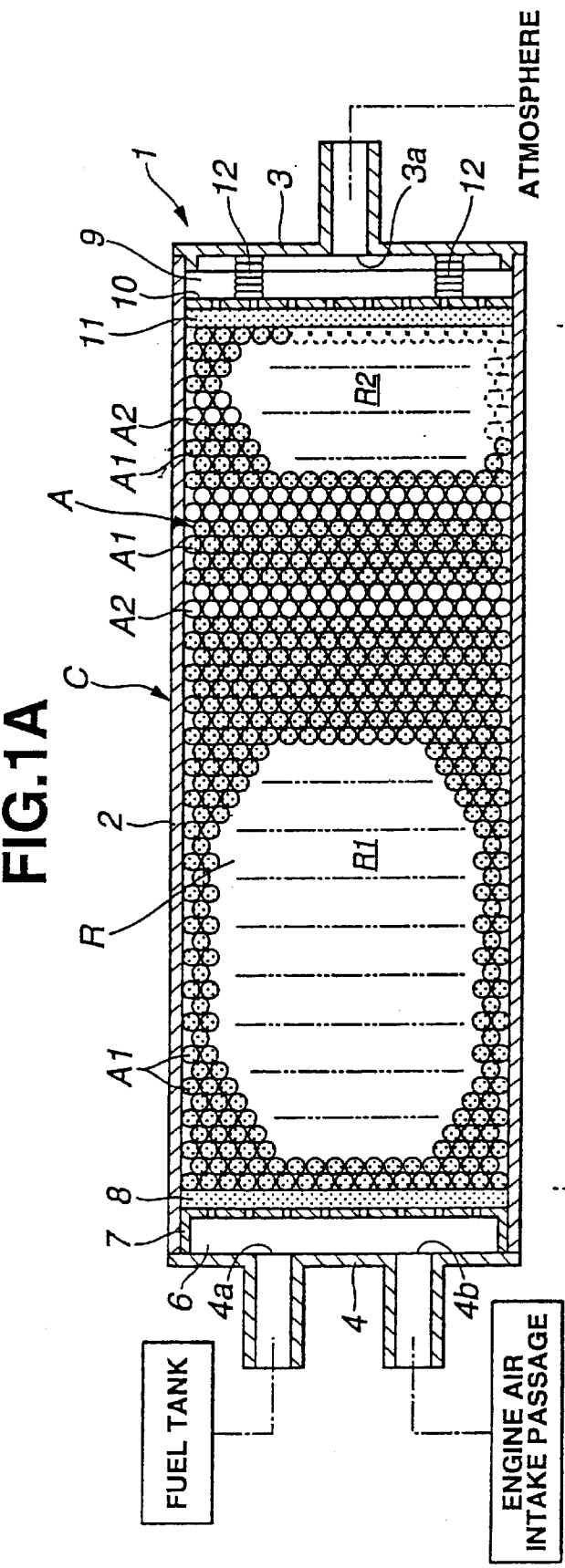
FIG. 1A is a longitudinal cross-sectional view of a first embodiment of a fuel vapor treatment canister according to the present invention.

Referring now to FIG. 1A of the drawings, a first embodiment of a fuel vapor treatment canister is illustrated by the reference numeral 1. The canister 1 of this embodiment is for an automotive vehicle and comprises a casing C formed of a plastic such as NYLON or polypropylene. The casing C includes a casing body 2 having a circular cross-section. The casing body 2 is provided at its one end (right-side end in FIG. 1A) with a first end wall 3, and at the other end (left-side end in FIG. 1A) with a second end wall 4. The first end wall 3 has a pipe defining therein a communication opening 3a which is in communication with atmospheric air. The second end wall 4 has an upper pipe defining therein a fuel vapor inlet opening 4a which is in communication with a fuel tank so that fuel vapor is flown in through the opening 4a. The second end wall 4 further has a lower pipe defining therein a fuel vapor outlet opening 4b which in communication with an air intake passage of an intake system of an internal combustion engine (not shown) so that fuel vapor is flow out through the opening 4b. It will be understood that intake air to be sucked into the engine flows through the air intake passage. Each of the first and second end walls 3, 4 is fixed to the casing 2 by means of vibration-welding.

A perforated dish-like plate 7 is disposed inside the casing body 2 and located adjacent the second end wall 4. The dish-like plate 7 is formed at its main body section with a plurality of through-holes (not identified) and has a cylindrical flange section (not identified) which is fitted to the inner surface of the casing body 2 and in contact with the second end wall 4 so that a space 6 is defined between the main body section (formed with the through-holes) of the dish-like plate 7 and the second end wall 4. A circular sheet-like filter 8 is formed of non-woven fabric of polyester and is disposed inside the dish-like plate 7 so as to be in contact with the main body section of the dish-like plate 7.

A circular perforated plate 10 formed of plastic is disposed inside the casing body 2 and located adjacent the first end wall 3 in such a manner that the periphery of the perforated plate 10 is in contact with the inner surface of the casing body 2. Two compression springs 12, 12 are disposed between the perforated plate 10 and the first end walls 3 so as to define a space 9 inside the casing body 2. A filter 11 similar to the filter 8 is disposed inside and in contact with the perforated plate 10. A chamber or inside space R between the filter 8 and the filter 11. The chamber R includes a vapor adsorption chamber R1 and a heat accumulation and vapor adsorption chamber R2. It will be understood that the volume of the chamber R2 is smaller than that of he chamber R1.

The vapor adsorption chamber R1 is filled with a fuel vapor adsorbing material A1 formed of activated carbon particles. The heat accumulation and vapor adsorption chamber R2 is filled with a heat-accumulative and fuel vapor adsorbing material A which includes a fuel vapor adsorbing material A1 and a heat-accumulative material A2 which is higher in heat conductivity and specific heat than the fuel vapor-adsorbing material A1. In this embodiment, the fuel vapor adsorbing (granular) material A1 and the heat-accumulative (granular) material A2 are respectively formed into circular layers and located alternate in the axial direction of the casing body 2 so that the vapor adsorbing material A1 is located between the layers of the heat-accumulative material A2. In other words, the heat-accumulative and fuel vapor adsorbing material A is constituted of alternative layers of the fuel vapor adsorbing material A1 and the heat-accumulative material A2. Each of the layers of the fuel vapor adsorbing material A1 and the heat-accumulative material A2 has its periphery in contact with the inner surface of the casing body 2 and extends perpendicular to the axis of the casing body 2. Examples of the heat-accumulative material A2 are aluminum, aluminum alloy, ceramic such as alumina, and stainless steel.

The perforated plate 10 is pressed leftward in FIG. 1A by the compression springs 12, 12 seated on the first end wall 3, and therefore the fuel vapor adsorbing material A1 and the heat-accumulative material A2 are kept in a tightly filled state under the bias of the compression springs 12, 12, in which the materials A1, A2 are pressed toward the perforated plate 7 at the side of the second end wall 4. A ratio in volume between the vapor adsorption chamber R1 and the heat accumulation and vapor adsorption chamber R2 is decided in accordance with kind, size, displacement, operating conditions and the like of the engine for the vehicle to which the fuel vapor treatment canister 1 is installed.

The manner of operation of the fuel vapor treatment canister 1 will be discussed.

Fuel vapor from the fuel tank is flown through the fuel vapor inlet opening 4a into the space 6 and then introduced through the dish-like plate 7 and the filter 8 into the vapor adsorption chamber R1 and the heat accumulation and vapor adsorption chamber R2 so that fuel vapor is adsorbed by the fuel vapor adsorbing material A1. In this case, fuel vapor is first adsorbed by the fuel vapor adsorbing material A1 located at a left-side (side of the second end wall 4) portion of the chamber R1 and then gradually adsorbed by the fuel vapor adsorbing material A1 located at a right-side (side of the first end wall 3) portion of the chamber R1.

Figure 1B:
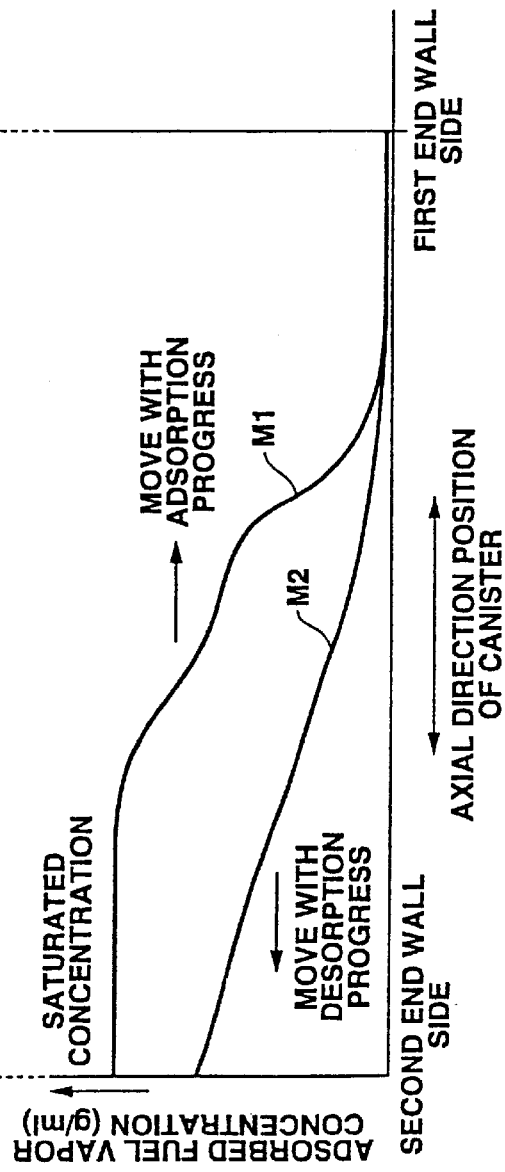
FIG. 1B is a graph showing the concentration of fuel vapor adsorbed in the canister of FIG. 1A in terms of the axial direction positions of the canister.

Accordingly, as shown in FIG. 1B, a saturated portion (saturated with fuel vapor) of the fuel vapor adsorbing material A1 moves rightward or toward the first end wall 3 as adsorption of fuel vapor proceeds. More specifically, at the initial period of a process of fuel vapor adsorption, the fuel vapor adsorbing material A1 located near the first end wall 3 does not participate to fuel vapor adsorption; however, as the fuel vapor adsorption proceeds, the fuel vapor absorbing material A1 gradually becomes participant to fuel vapor deposition. When fuel vapor reaches the fuel vapor adsorbing material A1 located near the first end wall 3, fuel vapor can be released to the atmosphere even though the fuel vapor adsorption is not in a saturated state. Then, as fuel vapor adsorption in the fuel vapor adsorbing material A1 located near the first end wall 3 proceeds, release of fuel vapor from the canister 1 gradually increases.

Within the heat accumulation and vapor deposition chamber R2, the fuel vapor adsorbing material A1 and the heat-accumulative material A2 are alternately located. The heat-accumulative material A2 adsorbs heat generated from the fuel vapor adsorbing material A1 during adsorption of fuel vapor by the fuel vapor adsorbing material A2, thereby softening temperature rise of the fuel vapor adsorbing material A1 itself. This suppresses lowering in fuel vapor adsorbing ability of the fuel vapor adsorbing material A1. Consequently, fuel vapor which flows in the from the side of the second end wall 4 can be effectively adsorbed by the fuel vapor adsorbing material A1, thereby preventing fuel vapor (not adsorbed) from being released through the communication opening 3a to the atmosphere.

Additionally, when fuel vapor is released from the canister 1 under a condition where the fuel vapor has been adsorbed in the fuel vapor adsorbing material A1 within the vapor adsorption chamber R1 and the heat accumulation and vapor adsorption chamber R2, the fuel vapor is desorbed from the fuel vapor adsorbing material A1 under the influence of air flown from the communication opening 3a. At this time, owing to the heat releasing action of the heat-accumulative material A2 within the heat accumulation and vapor adsorption chamber R2, a temperature lowering of the fuel vapor adsorbing material A1 due to fuel vapor desorption from the fuel vapor adsorbing material A1 can be softened or suppressed. As a result, desorption of fuel vapor adsorbed in the fuel vapor adsorbing material A1 can be effectively accomplished, so that a desorption temperature (at which fuel vapor is desorbed from the fuel vapor adsorbing material A1) of the fuel vapor adsorbing material A1 is kept at a high level as compared with a case where only the fuel vapor adsorbing material A1 is stored in the chamber R of the canister 1, thus lowering a vapor residual level (at which fuel vapor remains not-desorbed in the fuel vapor adsorbing material A1).

Subsequently, when the thus desorbed fuel vapor flows toward the second end wall 4, it passes through the fuel vapor adsorbing material A1 within the vapor adsorption chamber R1. Here, only fuel vapor adsorbing material A1 is stored in the chamber R1, and therefore a temperature lowering is made in the fuel vapor adsorbing material A1 under desorption of fuel vapor from the fuel vapor adsorbing material A1 thereby increasing a fuel vapor adsorbing ability of the fuel vapor adsorbing material A1. This maintains a high vapor residual level, so that abrupt release of adsorbed fuel vapor cannot be made. It will be understood that abrupt desorption of fuel vapor from the chamber R2 is buffered during passage of the chamber R1, so that change in concentration of fuel vapor to be sucked into the engine can be moderated.

As appreciated from the above, when air containing fuel vapor flows from the side of the second end wall 4 to the side of the first end wall 3 so that fuel vapor is adsorbed in the canister 1, distribution of concentration of fuel vapor within the chamber R takes a mode indicated by a curve M1 as shown in FIG. 1B. It will be understood that the mode indicated by the curve M1 moves rightward in FIG. 1A or toward the first end wall 3 as adsorption of fuel vapor proceeds. When air introduced through the opening 3a flows from the side of the first end wall 3 to the side of the second end wall 4 so that fuel vapor adsorbed in the canister 1 is released from the canister, the distribution of concentration of fuel vapor within the chamber R takes a mode indicated by a curve M2. It will be understood that the mode indicated by the curve M2 moves leftward in FIG. 1 or toward the second end wall 3 as release of fuel vapor proceeds. The above-mentioned concentration means the weight of vapor (g) adsorbed per one ml of the fuel vapor adsorbing material A1.

In the fuel vapor treatment canister 1 of this embodiment, a gas-permeable partition wall (not shown) may be provided between the chambers R1 and R2, in which the partition wall is formed of a circular and porous metal, plastic or non-woven sheet. The partition wall is formed of a material having a low or high heat insulating ability.

FIG. 2A illustrates a second embodiment of the fuel vapor treatment canister 1 according to the present invention, which is similar to the first embodiment with the following exception: A circular sheet-like filter 14 similar to that 8 is disposed in the chamber R in such a manner that its periphery is in contact with the inner surface of the casing body 2. The sheet-like filter 14 divides the chamber R into the vapor adsorption chamber R1 and the heat accumulation and vapor adsorption chamber R2. The sheet-like filter 14 serving as a partition wall is thin and therefore is low in heat insulating ability.

In operation, heat generated within the fuel vapor adsorption chamber R1 during adsorption of fuel vapor is difficult to be transmitted to the heat accumulation and fuel vapor adsorption chamber R2 since the chambers R1, R2 are divided by the partition wall 14 having air permeability and heat insulating ability. Accordingly, when air containing fuel vapor introduced through the opening 4a flows from the side of the second end wall 4 to the side of the first end wall 1, the temperature within the chamber R1 is kept lower than that in case of the first embodiment. Consequently, as indicated by a mode indicated by a curve M3 in FIG. 2B, the fuel vapor adsorbing material A1 within the chamber R2 adjacent the filter 14 can adsorb much fuel vapor during adsorption of fuel vapor as compared with that (indicated by a dotted line in FIG. 2B) in case of the first embodiment. Additionally, when air introduced through the opening 3a flows from the side of the first end wall 3 and the side of the second end wall 4, the temperature within the chamber R2 adjacent the filter 14 is kept higher than that in case of the first embodiment. Consequently, as indicated by a mode indicated by a curve M4 in FIG. 2B, the fuel vapor adsorbing material A within the chamber R2 adjacent the filter 14 can desorb much fuel vapor during desorption of fuel vapor as compared with that (indicated by a dotted line in FIG. 2B) in case of the first embodiment. It will be understood that the same effects as those in the first embodiment can be obtained.

Figure 4:
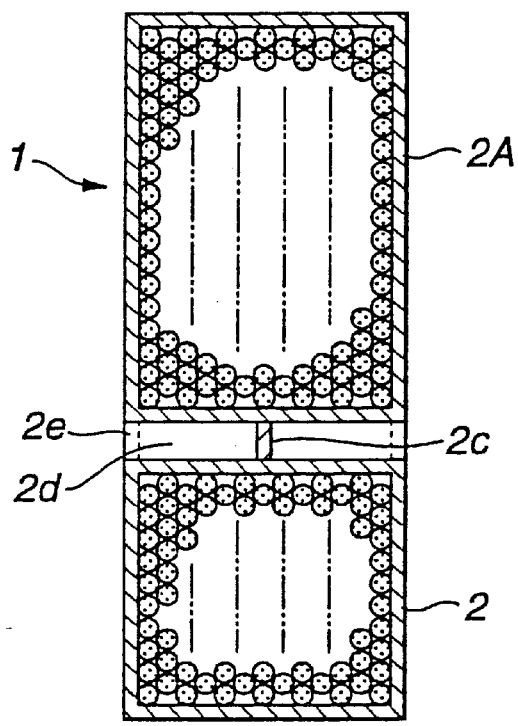
FIG. 4 is a cross-sectional view taken in the direction of arrows substantially along the line IV—IV of FIG. 3.
Figure 5:
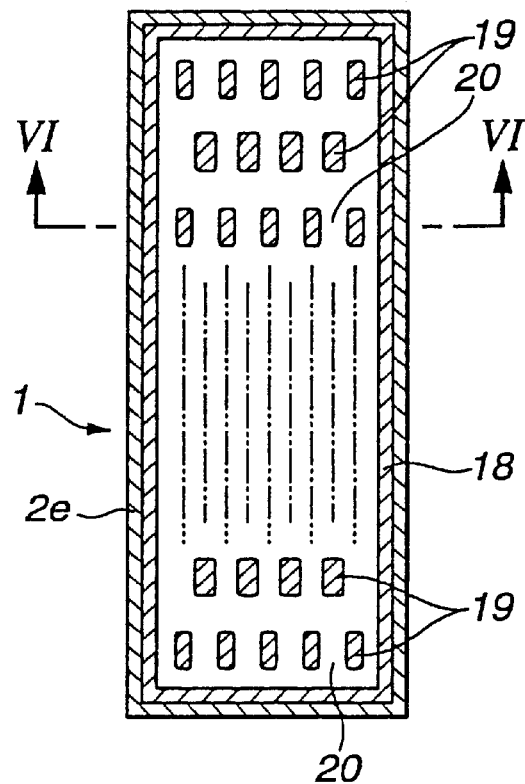
FIG. 5 is a cross-sectional view taken in the direction of arrows substantially along the line V—V of FIG. 3.
Figure 6:
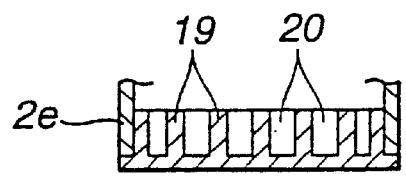
FIG. 6 is a cross-sectional view taken in the direction of arrows substantially along the line VI—VI of FIG. 5.

FIGS. 3 to 6 illustrate a third embodiment of the fuel vapor treatment canister 1 according to the present invention, similar to the first embodiment generally with the exception that another vapor adsorption chamber R1A is formed in communication with the vapor adsorption chamber R1 and located parallel with the vapor adsorption chamber R1 and the heat accumulation and fuel vapor adsorption chamber R2. In this embodiment, the casing C and a casing C1 are formed of the same material as that of the casing C of the first embodiment. The casing C and the casing C1 are located parallel with each other and have a rectangular cross-section. The casing C and the casing C1 are fixedly connected with each other through a connecting wall 2c and an end connecting wall 2d. Additionally, the casing body 2 of the casing C and the casing body 2A of the casing C1 extend leftward over the end connecting wall 2d to form an extended section 2e. The cross-sectional area of the inside space of the casing body 2A is about 2 times of that of the casing body 2 as shown in FIG. 4.

The casing C1 includes the second end wall 4 which is located adjacent the first end wall 3. In this embodiment, the two compression springs 12, 12 are disposed between the second end wall 4 and the plate 7. The first and second end walls 3, 4 are respectively fixed to the casing body 2 and the casing body 2A by welding.

A bottom end wall 18 is fixed to the extended section 2e of the casing body 2 and the casing body 2A. The bottom end wall 18 is rectangular and formed with a plurality of embossments 19 having a rectangular cross-section. The embossments 19 are separate from each other to form a gas passage 20. A rectangular sheet-like filter 16 is disposed inside the extended section 2e in such a manner that its periphery is in contact with the inner surface of the extended section 2e. The filter 16 is supported by the embossments 19 of the bottom end wall 18 so as to contact with the end connection wall 2d.

The fuel vapor adsorbing material A1 is filled in the fuel vapor adsorption chamber R1A defined between the filter 8 and the filter 16. Also in this embodiment, the fuel vapor adsorbing material A1 is filled in the fuel vapor adsorption chamber R1 defined between the filter 14 and the filter 16. The fuel vapor adsorption chambers R1, R1A are communicated with each other through the filter 16 and the gas passage 20.

It will be understood that, in this embodiment, the first and second end walls 3, 4, the plates 7, 10 and the filters 8, 11 and 14 are rectangular so that their peripheries are in contact with the inner surfaces of the casing bodies 2, 2A having the rectangular cross-section.

The manner operation of the fuel vapor treatment canister of the third embodiment will be discussed.

Fuel vapor generated in the fuel tank flows through the opening 4a, the fuel vapor adsorption chamber R1A, the gas passage 20, the fuel vapor adsorption chamber R1 in the order mentioned and reaches the heat accumulation and fuel vapor adsorption chamber R2. Accordingly, during adsorption of fuel vapor, flowing fuel vapor is adsorbed successively in the fuel vapor adsorbing material A1 is located on the upstream side and the fuel vapor adsorbing material A1 on the downstream side relative to flow of fuel vapor.

In this embodiment, similarly to the first embodiment, the fuel vapor adsorbing material A1 and the heat-accumulative material A2 are stored in the heat accumulation and fuel vapor adsorption chamber R2 located adjacent the first end wall 3, and therefore the same effects as those in the first embodiment can be obtained during adsorption of fuel vapor and during desorption of fuel vapor.

Additionally, the total space including the fuel vapor adsorption chambers R1, R1A is larger than the space of the heat accumulation and fuel vapor adsorption chamber R2 storing the fuel adsorbing material A1 and the heat-accumulative material A2, and therefore the amount of the heat-accumulative material A2 is less while the fuel vapor adsorbing material A1 are more in the whole chamber R similarly to in the first embodiment. As a result, it is made possible to absorb a large amount of fuel vapor which gradually evaporates in and flows into the canister 1 under temperature difference between day and night during a long period of time.

Figure 7:
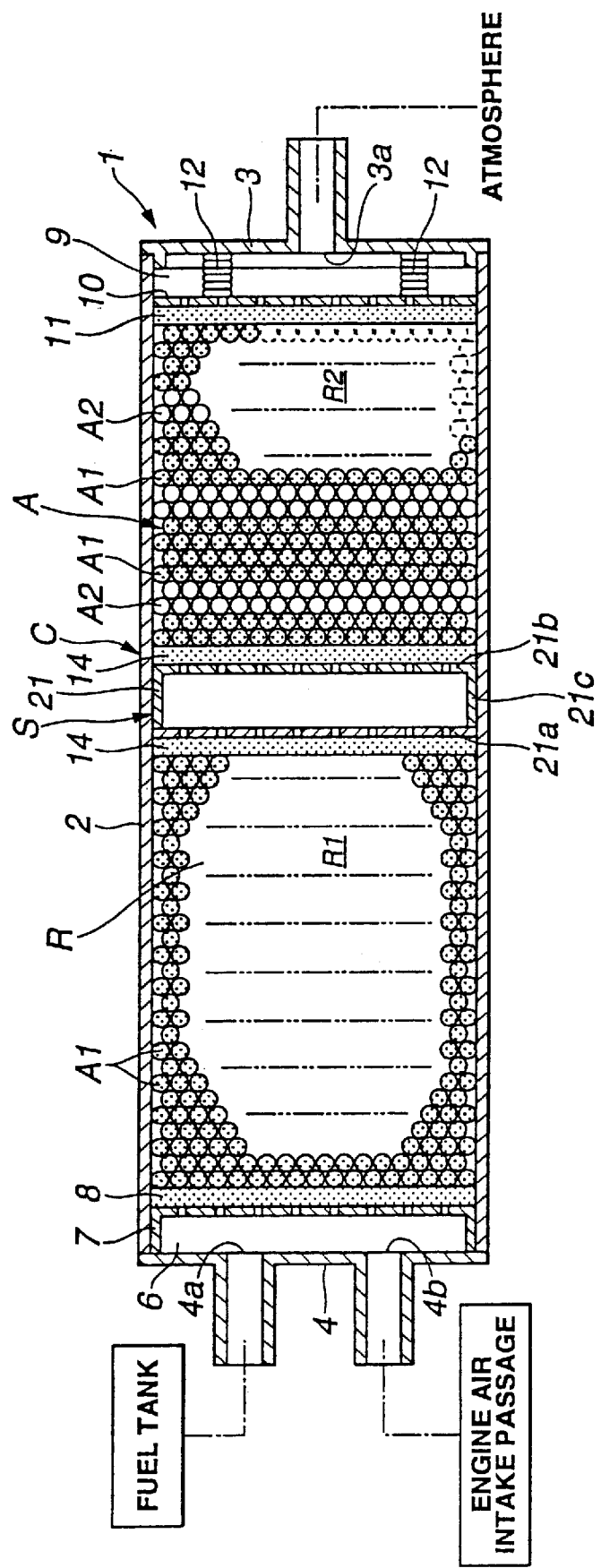
FIG. 7 is a longitudinal cross-sectional view of a fourth embodiment of the fuel vapor treatment canister according to the present invention.

FIG. 7 illustrates a fourth embodiment of the fuel vapor treatment canister according to the present invention, which is similar to the second embodiment with the exception that the filter 14 as the partition wall is replaced with a partition wall arrangement S including two filters 14, 14 and an air chamber forming member 21.

In this embodiment, the chamber R is divided into the fuel vapor adsorption chamber R1 and the heat accumulation and fuel vapor adsorption chamber R2 by the partition wall arrangement S. The partition wall arrangement S includes the air chamber forming member 21 which is formed of the same plastic as that of the casing body 2. The air chamber forming member 21 includes a pair of perforated walls 21a, 21b which are disposed respectively on the side of the chamber R1 and the side of the chamber R2. The perforated walls 21a, 21b are spaced from each other by a space maintaining member 21c located between and integral with the perforated walls 21a, 21b. Each perforated wall 21a, 21b is formed with a plurality of openings through which air passes. The two filters 14, 14 are located respectively in contact with the perforated walls 21a, 21b in such a manner than the air chamber forming member 21 is located between the filters 14, 14. In other words, the chamber R1 and the chamber R2 are divided by the partition wall arrangement S having heat insulating ability and air permeability, while the chamber R1 and the chamber R2 are divided by the filter 14 in the second embodiment.

In a conventional case that a sufficient amount of air for desorbing fuel vapor adsorbed in the canister 1 cannot be supplied through the opening 3a of the first end wall 3 in view of controlling engine exhaust gas, fuel vapor in an amount over a standard level is released through the opening 3a to the atmosphere. This is assumed to be caused from the following fact: Heat generated by adsorption of fuel vapor in the fuel adsorption chamber R1 during adsorption of fuel vapor is transmitted to the heat accumulation and fuel vapor adsorption chamber R2 thereby raising the temperature of the heat adsorbing material A1 in the chamber R2 so as to lower the fuel vapor retaining ability. As a result, fuel vapor remaining in the fuel vapor adsorbing material A1 within the chamber R1 and the chamber R2 is desorbed and released through the opening 3a when the amount of air for desorbing fuel vapor is insufficient.

However, in the fuel vapor treatment canister of this embodiment, the partition wall arrangement S possessing heat insulating ability and air permeability is disposed between the chamber R1 and the chamber R2 so as to allow gas to flow between the chamber R1 and the chamber R2 but to prevent heat from being transmitted between the chamber R1 and the chamber R2. Consequently, the temperature of the fuel vapor adsorbing material A1 within the chamber R2 can be prevented from rising while preventing the fuel vapor adsorbing material A1 within the chamber R2 from lowering in fuel vapor retaining ability. As a result, fuel vapor remaining in the fuel vapor adsorbing material A1 within the chamber R1 and the chamber R2 can be prevented from releasing through the opening 3a of the first end wall 3 in the event that the amount of air for desorbing fuel vapor is insufficient.

Figure 8:
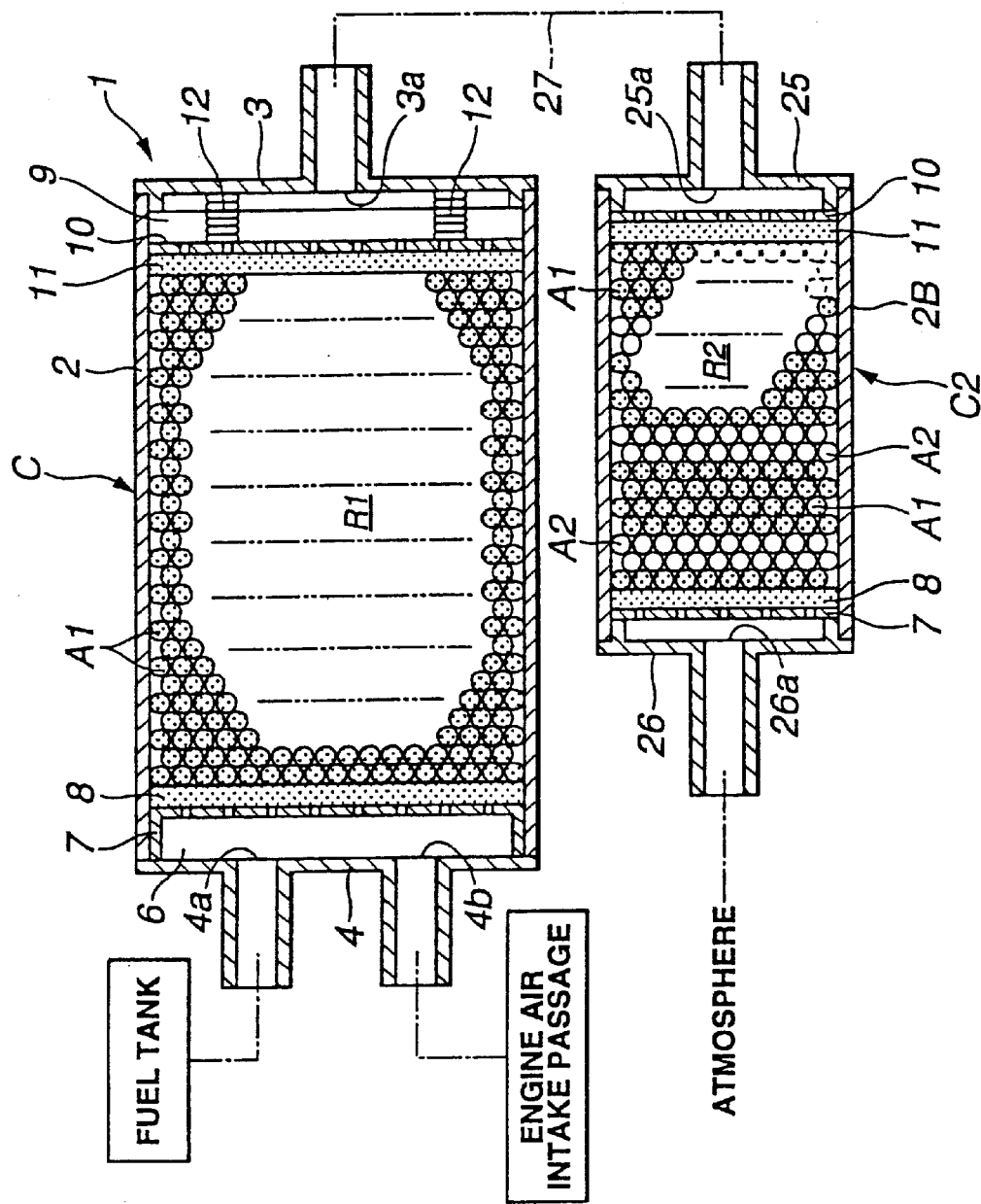
FIG. 8 is a longitudinal cross-sectional view of a fifth embodiment of the fuel vapor treatment canister according to the present invention.

FIG. 8 illustrates a fifth embodiment of the fuel vapor treatment canister 1 according to the present invention, which is similar to the first embodiment with the exception that the heat accumulation and fuel vapor adsorption chamber R2 filled with the fuel vapor adsorbing material A1 and the heat-accumulative material A2 is removed from the casing C and formed in another casing C2 which is independent from the casing C.

In this embodiment, the casing C is formed with only the fuel vapor adsorption chamber R1 which is defined between the filter 8 and the filter 11 and filled with the fuel vapor adsorbing material A1. The casing C2 includes a casing body 2B which is provided with a first end wall 25 and a second end wall 26. The first end wall 25 is fixed to one (left-side) end of the casing body 2B and has a pipe defining a communication opening 25a which is in communication with the opening 3a of the first end wall 3 of the casing C through a pipe 27. The second end wall 26 is fixed to the other (right-side) end of the casing body 2B and has a pipe defining a communication opening 26a which is in communication with the atmosphere. The perforated plate 10 and the filter 11 are disposed adjacent the first end wall 25 in such a manner as to define a space between the perforated plate 10 and the first end wall 25. The peripheries of the perforated plate 10 and the filter 11 are in contact with the inner surface of the casing body 2B. Additionally, the perforated plate 7 and the filter 8 are disposed adjacent the second wall 26 in such a manner as to define a space between the perforated plate 7 and the second end wall 26. The peripheries of the perforated plate 7 and the filter 8 are in contact with the inner surface of the casing body 2B. The heat accumulation and fuel vapor adsorption chamber R2 is defined between the filter 8 and the filter 11 and inside the casing body 2B. The chamber R2 is filled with the fuel vapor adsorbing material A1 and the heat-accumulative material A2 which are formed into the form of a layer and located alternate to each other.

In operation, since the casing C defining therein the chamber R1 and the casing C2 defining therein the chamber R2 are provided separate from each other, heat transmission between the chamber R1 and the chamber R2 can be prevented. Consequently, fuel vapor remaining in the fuel vapor adsorbing material A1 within the chamber R1 and the chamber R2 can be prevented from releasing through the communication opening 26a in case that the amount of air for desorbing fuel vapor is insufficient, similarly to in the fourth embodiment.

Figure 9:
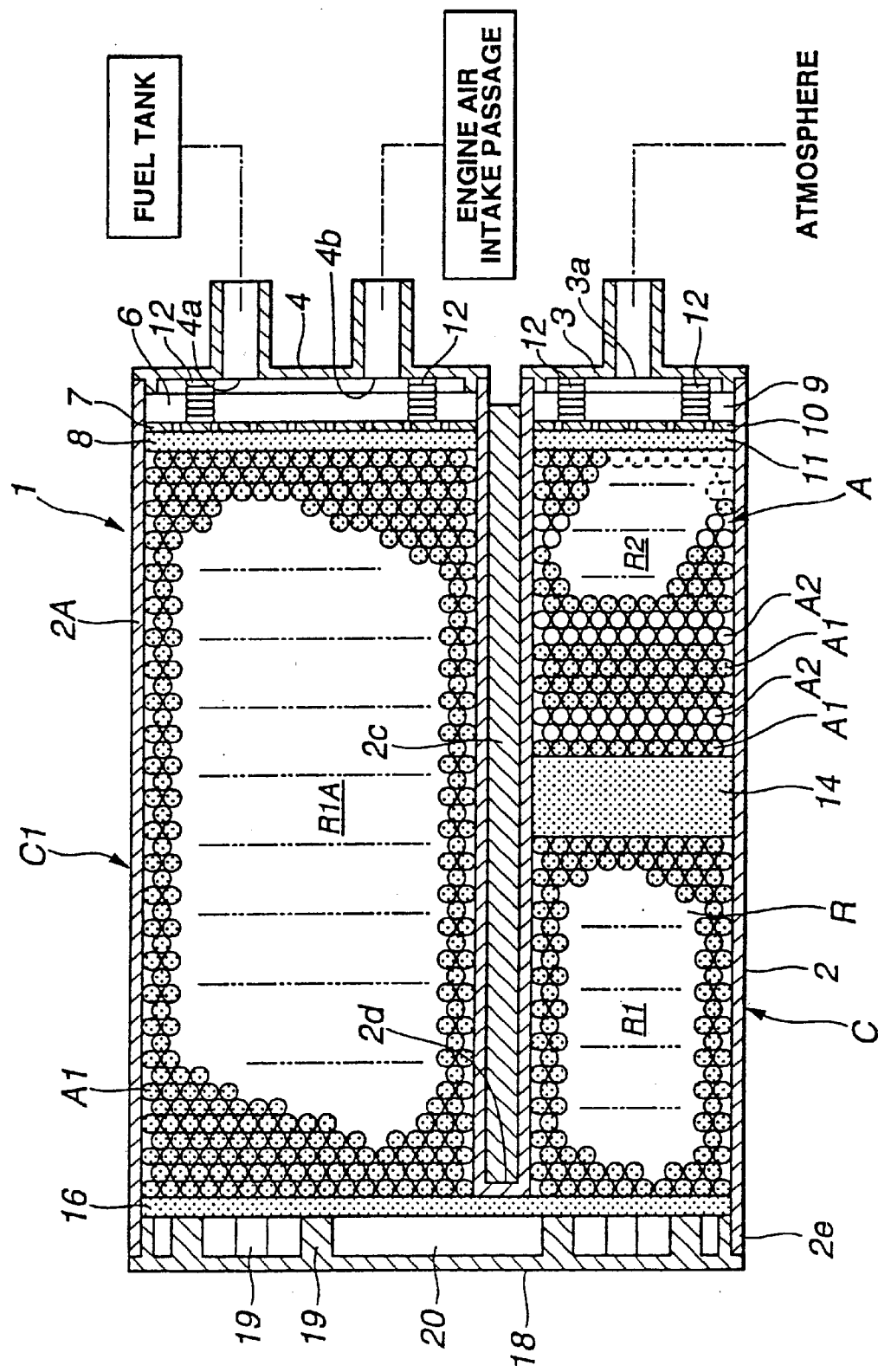
FIG. 9 is a longitudinal cross-sectional view of a sixth embodiment of the fuel vapor treatment canister according to the present invention.

FIG. 9 illustrates a sixth embodiment of the fuel vapor treatment canister 1 according to the present invention, which is similar to the third embodiment with the exception that the filter 14 for separating the heat accumulation and fuel vapor adsorption chamber R2 from the fuel vapor adsorption chamber R1 has a thickness considerably larger than that of the filter 14 in the third embodiment. Thus, the filter 14 of this embodiment serves as a partition wall having heat insulating ability and air permeability. This can prevent heat transmission from the fuel vapor adsorption chamber R1 to the heat accumulation and fuel vapor adsorption chamber R2. Consequently, fuel vapor remaining in the fuel vapor adsorbing material A1 within the chamber R1 and the chamber R2 can be prevented from releasing through the communication opening 3a in case that the amount of air for desorbing fuel vapor is insufficient, similarly to in the fourth embodiment.

Figure 10:
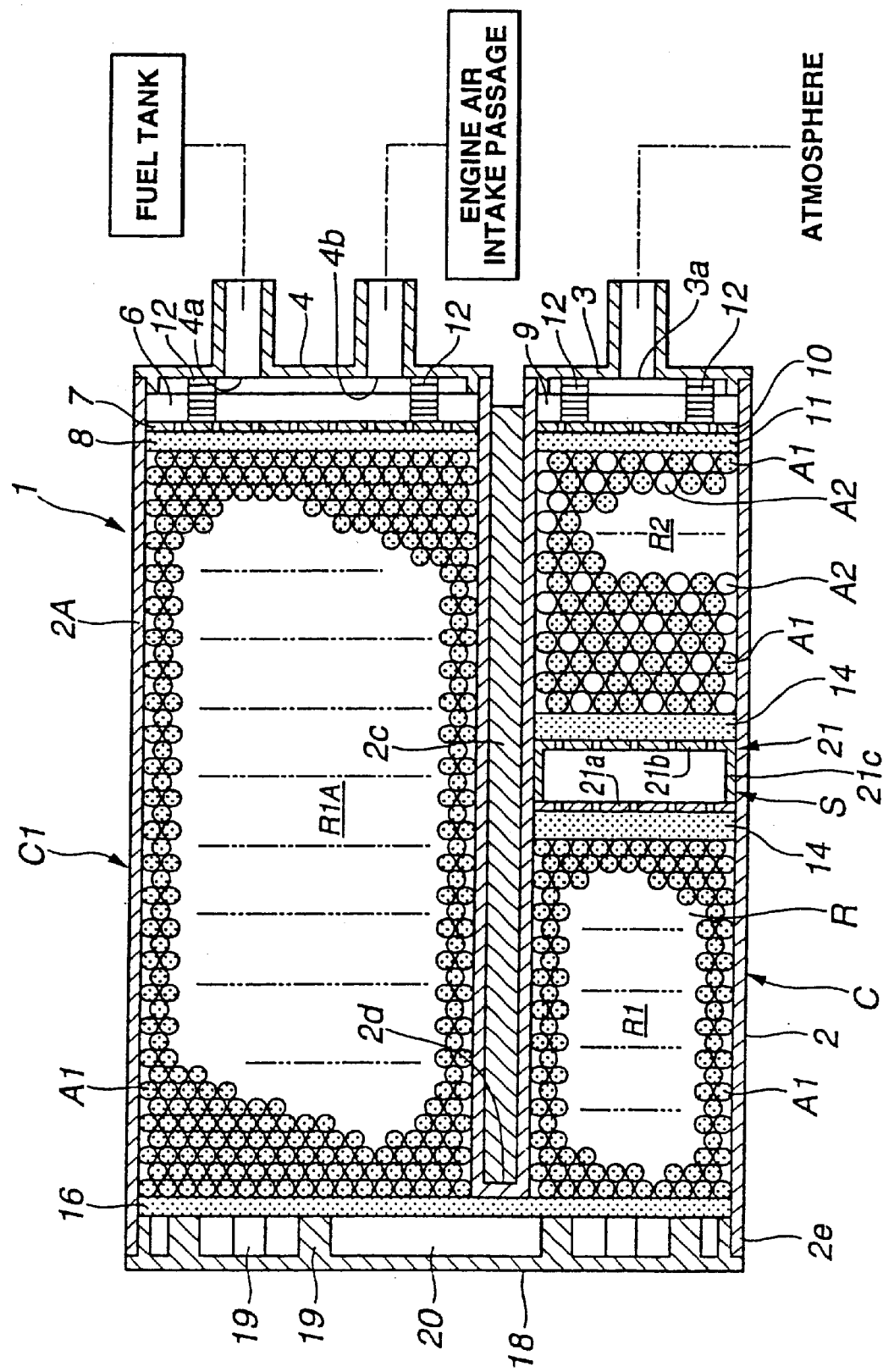
FIG. 10 is a longitudinal cross-sectional view of a seventh embodiment of the fuel vapor treatment canister according to the present invention.
Figure 14A:
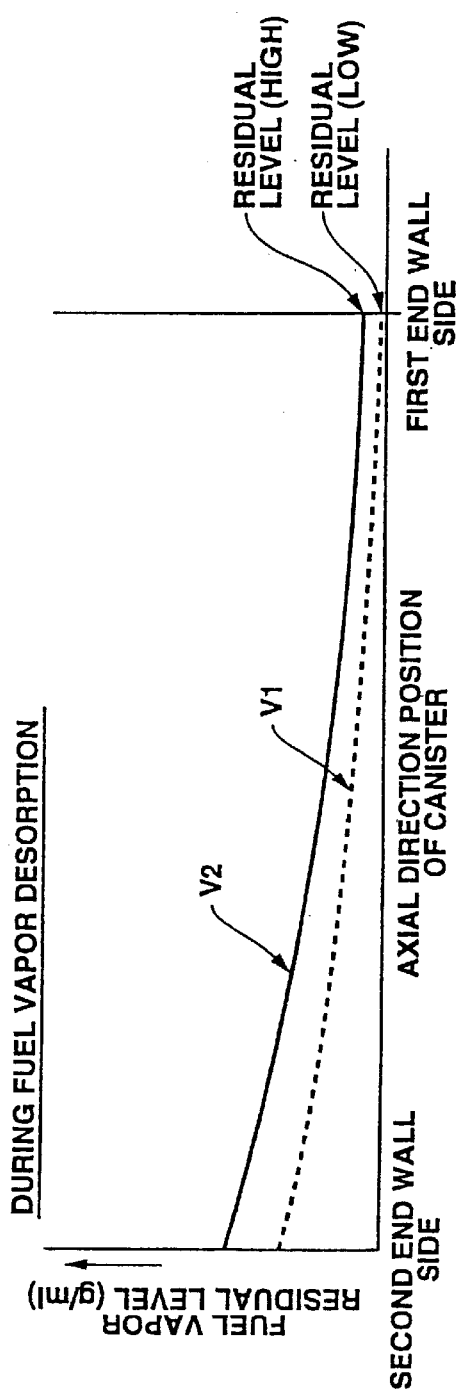
FIG. 14A is a graph showing the concentration of fuel vapor adsorbed (or a fuel vapor residual level) in the canister in terms of the axial direction positions of the canister of FIG. 13A during desorption of fuel vapor.
Figure 14B:
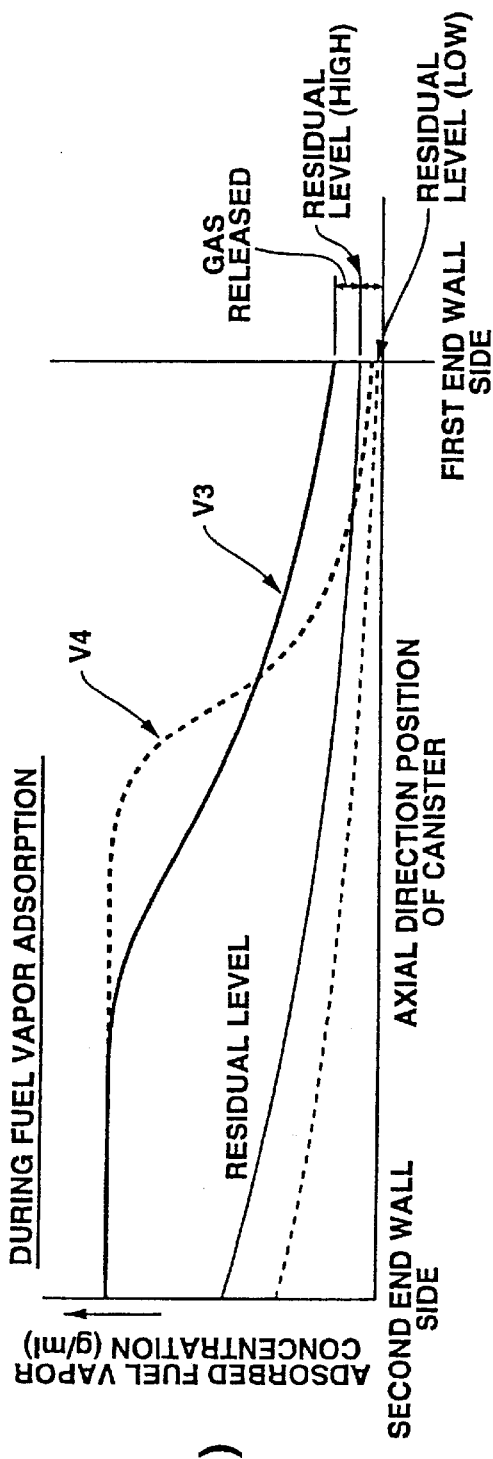
FIG. 14B is a graph showing the concentration of fuel vapor adsorbed in the canister axial direction positions in the canister of FIG. 13A during adsorption of fuel vapor.

FIG. 10 illustrates a seventh embodiment of the fuel vapor treatment canister 1 according to the present invention, which is similar to the third embodiment with the exception that the filter 14 for dividing the fuel vapor adsorption chamber R1 and the heat accumulation an fuel vapor adsorption chamber R2 is replaced with the partition wall arrangement S used in the fourth embodiment.

In this embodiment, the partition wall arrangement S divides the inside space of the casing body 2A into the fuel vapor adsorption chamber R1 and the heat accumulation and fuel vapor adsorption chamber R2. As shown, the fuel vapor adsorbing material A1 is filled in the chamber R1, while the fuel vapor adsorbing material A1 and the heat-accumulative material A2 is filled in a mixed state in the chamber R2. The partition wall arrangement S of this embodiment includes the air chamber forming member 21 which is formed of the same plastic as that of the casing body 2. The air chamber forming member 21 includes a pair of the perforated walls 21a, 21b which are disposed respectively on the sides of the chamber R1 and the chamber R2. The perforated walls 21a, 21b are spaced from each other by the space maintaining member 21c located between and integral with the perforated walls 21a, 21b. Each perforated walls 21a, 21b is formed with a plurality of openings through which air passes. The two filters 14, 14 are located respectively in contact with the perforated walls 21a, 21b in such a manner that the air chamber forming member 21 is located between the filters 14, 14.

Accordingly, also in this embodiment, heat transmission from the fuel vapor adsorption chamber R1 to the heat accumulation and fuel vapor adsorption chamber R2 can be prevented. Consequently, fuel vapor remaining in the fuel vapor adsorbing material A1 within the chamber R1 and the chamber R2 can be prevented from releasing through the communication opening 3a in case that the amount of air for desorbing fuel vapor is insufficient.

FIG. 11 illustrates an eighth embodiment of the fuel vapor treatment canister according to the present invention, which is similar to the third embodiment with the exception that only the heat accumulation and fuel vapor adsorption chamber R2 is formed inside the casing C without forming the fuel vapor adsorption chamber R1.

In this embodiment, the chamber R2 is formed between the filter 16 and the filter 11 and inside the casing C, and filled with the vapor fuel adsorbing material A1 and the heat-accumulative material A2 which are formed into a layer and located alternate to each other.

This embodiment prevents heat transmission from the fuel vapor adsorption chamber R1A to the heat accumulation and fuel vapor adsorption chamber R2 by a partition wall arrangement constituted by the bottom end wall 18 and the filter 16. Consequently, fuel vapor remaining in the fuel vapor adsorbing material A1 within the chamber R1A and the chamber R2 can be prevented from releasing through the communication opening 8a in case that the amount of air for desorbing fuel vapor is insufficient.

FIG. 12 illustrates a ninth embodiment of the fuel vapor treatment canister 1 according to the present invention, which is similar to the eighth embodiment with the exception that the heat accumulation and fuel vapor adsorption chamber R2 filled with the fuel vapor adsorbing material A1 and the heat-accumulative material A2 is replaced with a fuel vapor adsorption chamber R1B filled with the fuel vapor adsorbing material A1 and formed in another casing C3 which is independent from the casing C.

In this embodiment, the casing C is formed with only the fuel vapor adsorption chamber R1B which is defined between the filter 11 and the filter 16 and filled with the fuel vapor adsorbing material A1. The casing C3 is similar to the casing 2B in the fifth embodiment and includes a casing body 2C which is provided with the first end wall 25 and the second end wall 26. The first end wall 25 is fixed to one (left-side) end of the casing body 2C and has the pipe defining the communication opening 25a which is in communication with the opening 3a of the first end wall 3 of the casing C through the pipe 27. The second end wall 26 is fixed to the other (right-side) end of the casing body 2C and has a pipe defining the communication opening 26a which is in communication with the atmosphere. The perforated plate 10 and the filter 11 are disposed adjacent the first end wall 25 in such a manner as to define the space between the perforated plate 10 and the first end wall 25. The peripheries of the perforated plate 10 and the filter 11 are in contact with the inner surface of the casing body 2C. Additionally, the perforated plate 7 and the filter 8 are disposed adjacent the second end wall 26 in such a manner as to define a space between the perforated plate 7 and the second end wall 26. The peripheries of the perforated plate 7 and the filter 8 are in contact with the inner surface of the casing body 2C. The heat accumulation and fuel vapor adsorption chamber R2 is defined between the filter 8 and the filter 11 and filled wit the fuel vapor adsorbing material A1 and the heat-accumulative material A2 which are in a mixed state.

In operation, since the casing C defining therein the chamber R1B and the casing C3 defining therein the chamber R2 are provided separate from each other, heat transmission between the chamber R1B and the chamber R2 can be prevented. Consequently, fuel vapor remaining in the fuel vapor adsorbing material A1 within the chamber R1B and the chamber R2 can be prevented from releasing through the communication opening 26a in case that the amount of air for desorbing fuel vapor is insufficient, similarly to in the fourth embodiment.

The above-discussed embodiments may be modified as follows:

(1) While the first end wall 3, the second end wall 4 and the bottom end wall 18 have been shown and described as being fixedly connected, for example, by welding, it will be understood that at least of them may be formed integral with the casing body 2, 2A when the casing body is molded.

(2) While the fuel vapor inlet opening 4a and the fuel vapor outlet opening 4b are shown and described as being formed separate from each other, it will be understood that a single inlet-outlet opening serving as the fuel vapor inlet and outlet openings 4a, 4b may be formed in place of the separate openings 4a, 4b, in which a pipe connected to the inlet-outlet opening is bifurcated to be connected to the fuel tank and the engine air intake passage.

(3) While the filter 14 has been shown and described as being used for dividing the inside space of the casing C into the fuel vapor adsorption chamber R1 and the heat accumulation and fuel vapor adsorption chamber R2 in some embodiments, it will be appreciated that the filter 14 may be omitted. In this regard, the chamber R1 and the chamber R2 may be divided by a perforated plate disposed between the chambers R1, R2 or formed integral with the casing body.

(4) While the fuel vapor adsorbing material A1 and the heat-accumulative material A2 in the state of layers have been shown and described as being disposed within the heat accumulation and fuel vapor adsorption chamber R2 in some embodiments, it will be appreciated that the materials A1, A2 may be replaced with a heat-accumulative and fuel vapor adsorbing material prepared by mixing the fuel vapor adsorbing material A1 and the heat-accumulative material A2, or with another heat-accumulative and fuel vapor adsorbing material prepared by mixing fuel vapor adsorbing material matrix particles or powder (such as activated carbon particles or powder) with heat-accumulative material particles or powder having high heat conductivity and high specific heat as compared with the fuel vapor adsorbing material matrix powder, and then by molding the mixed particles or powders into the form of pellets or the like. Examples of the heat-accumulative material particles or powder are aluminum or aluminum alloy particles or powder, and ceramic particles or powder.

Additionally, it will be appreciated that the materials A1, A2 may be replaced with a honeycomb-shaped heat-accumulative and fuel vapor adsorbing material prepared by mixing the fuel vapor adsorbing material matrix particles or powder (such as activated carbon particles or powder) with the heat-accumulative material particle or powder and binder, and then by molding the mixed particles or powders into the honeycomb shape, so that the fuel vapor adsorbing material matrix particles or powder and the heat-accumulative material particle or powder are contained in a dispersed state in the honeycomb-shaped heat-accumulative and fuel vapor adsorbing materials.

As appreciated from the above, according to the present invention, the fuel vapor treatment canister has the fuel vapor adsorption chamber and the heat accumulation and fuel vapor adsorption chamber which are located respectively at the side of fuel vapor inlet and outlet openings and the side of the communication opening in communication with the atmosphere. The fuel vapor adsorbing material is disposed in the fuel vapor adsorption chamber, while the fuel vapor adsorbing material and the heat-accumulative material are disposed in the heat accumulation and fuel vapor adsorption chamber. Accordingly, during adsorption of fuel vapor in the canister, the fuel vapor adsorbing material within the heat accumulation and fuel vapor adsorption chamber is prevented from its temperature rise so that fuel vapor adsorption in the chamber can be securely accomplished, thereby effectively preventing release of fuel vapor to the atmosphere.

During desorption of fuel vapor in the canister, in the heat accumulation and fuel vapor adsorption chamber located at the side of the atmosphere-communication opening, the fuel vapor adsorbing material in the chamber is prevented from its temperature lowering owing to the heat release action of the heat-accumulation material in the chamber, so that depression of fuel vapor from the fuel vapor adsorbing material can be effectively carried out thereby lowering the fuel vapor residual level after the fuel vapor deposition. Accordingly, adsorption of fuel vapor at the next operational (adsorption-desorption) cycle can be ensured. In the fuel vapor adsorption chamber through which air containing the fuel vapor desorbed from the fuel vapor adsorbing material in the heat accumulation and fuel adsorption chamber flows, fuel vapor is desorbed from the fuel vapor adsorbing material in the fuel vapor adsorption chamber, causing temperature lowering of the fuel vapor adsorbing material. This prevents abrupt desorption of fuel vapor from the fuel adsorbing material in the fuel vapor adsorption chamber, so that fuel vapor is gradually desorbed from the fuel vapor adsorbing material. As a result, a large amount of fuel vapor is prevented from being abruptly sucked into the engine. This effectively prevents disorder of the engine and considerable emission of hydrocarbons in exhaust gas from the engine due to excessive fuel (hydrocarbons) in air-fuel mixture to be sucked into the engine.

Additionally, since the heat-accumulative material is disposed only in the heat accumulation and fuel vapor adsorption chamber, the amount of the heat-accumulative material used in the canister can be reduced while increasing the amount of the fuel vapor adsorbing material used in the canister without increasing the size of the casing of the canister. Thus, the fuel vapor adsorbing ability of the canister can be increased without large-sizing the canister.

Further, the partition wall may be provided between the fuel vapor adsorption chamber and the heat accumulation and fuel vapor adsorption chamber, or otherwise the fuel vapor adsorption chamber and the heat accumulation and fuel vapor adsorption chamber may be formed respectively in the separate casings, so as to prevent heat transmission from the fuel vapor adsorption chamber to the heat accumulation and fuel vapor adsorption chamber. Consequently, the fuel vapor adsorbing material in the heat accumulation and fuel vapor adsorption chamber can be prevented from its temperature rise even though the temperature of the fuel vapor adsorbing material in the fuel vapor adsorption chamber rises. This prevents a temperature rise of the fuel vapor adsorbing material in the heat accumulation and fuel vapor adsorption chamber while preventing lowering in the fuel vapor retaining ability of the fuel vapor adsorbing material in the heat accumulation and fuel vapor adsorption chamber. As a result, even in case that the amount of air for desorbing fuel vapor from the fuel vapor adsorbing material is insufficient, fuel vapor remaining in the fuel vapor adsorption chamber and the heat accumulation and fuel vapor adsorption chamber can be prevented from being released through the atmosphere-communication opening in the canister.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A fuel vapor treatment canister comprising:
   a casing arrangement having first and second end walls between which first and second chambers are formed, said first end wall having a portion defining a first opening in communication with a fuel tank, and a portion defining a second opening in communication with an air intake passage of an engine, said second end wall having a portion defining a third opening in communication with atmosphere, said first chamber being located closer to said first end wall than said second chamber;
   a first fuel vapor adsorbing material disposed in said first chamber; and
   a second fuel vapor adsorbing material and a heat-accumulative material, disposed in said second chamber, said heat-accumulative material being larger in specific heat than said second fuel vapor adsorbing material.

2. A fuel vapor treatment canister as claimed in claim 1, wherein at least one of said first and second fuel vapor adsorbing materials is granular.

3. A fuel vapor treatment canister as claimed in claim 2, wherein said second fuel vapor adsorbing material and said heat-accumulative material form first and second layers, respectively, said first and second layers being located alternate to each other in a direction in which fuel vapor flows.

4. A fuel vapor treatment canister as claimed in claim 3, wherein each of said first and second layers extends perpendicular to an axis of said second chamber.

5. A fuel vapor treatment canister as claimed in claim 1, wherein said first and second fuel vapor adsorbing materials are activated carbon.

6. A fuel vapor treatment canister as claimed in claim 1, wherein said heat-accumulative material is at least one selected from the group consisting of aluminum, aluminum alloy, ceramic, and stainless steel.

7. A fuel vapor treatment canister comprising:
  a casing having first and second end walls between which an inside space is formed, said first end wall having a portion defining a first opening in communication with a fuel tank, and a portion defining a second opening in communication with an air intake passage of an engine, said second end wall having a portion defining a third opening in communication with atmosphere, said inside space including first and second chambers, said first chamber being located closer to said first end wall than said second chamber;
  a first fuel vapor adsorbing material disposed in said first chamber; and
  a second fuel vapor adsorbing material and a heat-accumulative material, disposed in said second chamber, said heat-accumulative material being larger in specific heat than said second fuel vapor adsorbing material.

8. A fuel vapor treatment canister comprising:
  a casing having first and second end walls between which an inside space is formed, said first end wall having a portion defining a first opening in communication with a fuel tank, and a portion defining a second opening in communication with an air intake passage of an engine, said second end wall having a portion defining a third opening in communication with atmosphere, said inside space including first and second chambers, said first chamber being located closer to said first end wall than said second chamber;
  a partition wall structure disposed to divide said inside space into said first and second chambers, said partition wall structure having an air permeability and a heat insulating ability higher than that of metal;
  a first fuel vapor adsorbing material disposed in said first chamber; and
  a second fuel vapor adsorbing material and a heat-accumulative material, disposed in said second chamber, said heat-accumulative material being larger in specific heat than said second fuel vapor adsorbing material.

9. A fuel vapor treatment canister comprising:
  a first casing having first and second end walls between which a first chamber is formed, said first end wall having a portion defining a first opening in communication with a fuel tank, and a portion defining a second opening;
  a second casing having third and fourth end walls between which a second chamber is formed, said third end wall having a portion defining a third opening in communication with said second opening of said first casing, said fourth end wall having a portion defining a fourth opening in communication with atmosphere;
  a first fuel vapor adsorbing material disposed in said first chamber; and
  a second fuel vapor adsorbing material and a heat-accumulative material, disposed in said second chamber, said heat-accumulative material being larger in specific heat than said second fuel vapor adsorbing material.

10. A fuel vapor treatment canister as claimed in claim 1, wherein said first chamber is larger in volume than said second chamber.

11. A fuel vapor treatment canister comprising:
  a casing arrangement having first and second end walls between which first and second chambers are formed, said first end wall having a portion defining a first opening in communication with a fuel tank, and a portion defining a second opening in communication with an air intake passage of an engine, said second end wall having a portion defining a third opening in communication with atmosphere, said first chamber being located closer to said first end wall than said second chamber, said first chamber being larger in volume than said second chamber;
  a first fuel vapor adsorbing material disposed in said first chamber; and
  a second fuel vapor adsorbing material and a heat-accumulative material, disposed in said second chamber, said heat-accumulative material being larger in specific heat than said second fuel vapor adsorbing material, said heat-accumulative material being selected from the group consisting of aluminum, aluminum alloy, ceramic and stainless steel.

* * * * *